United States Patent [19]

Underwood et al.

[11] Patent Number: 4,954,022

[45] Date of Patent: Sep. 4, 1990

[54] METHOD FOR MACHINING MULTIPLE CUTS IN A WORKPIECE TO A UNIFORM DEPTH

[75] Inventors: James L. Underwood, Kennesaw; Floyd K. Williams, Marietta; Ricky W. Tumlin, Ackworth, all of Ga.

[73] Assignee: Underwood Mold Co., Inc., Woodstock, Ga.

[21] Appl. No.: 367,030

[22] Filed: Jun. 16, 1989

[51] Int. Cl.$^5$ ............................................. B23B 35/00
[52] U.S. Cl. ............................... 408/1 R; 364/474.35; 408/13; 408/61; 408/71; 409/84; 409/132
[58] Field of Search ................... 408/1 R, 13, 71, 89, 408/91, 8, 10, 11, 12, 56, 61; 409/131, 132, 133, 218, 220, 224, 84, 184, 193, 195; 364/474.28, 474.29, 474.35

[56] References Cited

U.S. PATENT DOCUMENTS

| | | | |
|---|---|---|---|
| 3,601,572 | 8/1971 | Check et al. | 408/13 |
| 3,822,959 | 7/1974 | Tabard | 408/89 |
| 3,841,199 | 10/1974 | Jepson et al. | 408/71 |
| 3,841,780 | 10/1974 | Mengeringhausen | 408/1 R |
| 3,969,615 | 7/1976 | Bowers et al. | 364/474.29 |
| 4,203,691 | 5/1980 | Nishimura et al. | 408/13 |
| 4,657,451 | 4/1987 | Tanaka | 408/13 |
| 4,826,370 | 5/1989 | Conradsson | 409/218 |

FOREIGN PATENT DOCUMENTS 709326  1/1980  U.S.S.R. .............................. 408/66

*Primary Examiner*—Daniel W. Howell
*Attorney, Agent, or Firm*—Jones, Askew & Lunsford

[57] ABSTRACT

There is disclosed a method for machining multiple holes in a workpiece to a uniform depth and at a predetermined angle to the surface of the workpiece. The method is performed by a numerically controlled machine tool which orients the workpiece in space with respect to a reference coordinate system which establishes an expected position of the surface of the workpiece. The actual position of the surface of the workpiece is determined by sensing contact between the workpiece and the boring tool. Once the actual position of the workpiece surface has been sensed, the tool is advanced a predetermined distance to provide a uniform depth cut. The expected position, the actual position, and the deviation between the two are recorded to assure that the surface of the workpiece is accurately sensed during subsequent machining steps. In order to minimize false premature sensing of the workpiece, the surface of the workpiece is coated with a nonconductive enamel, air is blown across the surface of the workpiece to remove debris, and an insulating liquid coolant-/lubricant is used during the drilling of the workpiece.

18 Claims, 4 Drawing Sheets

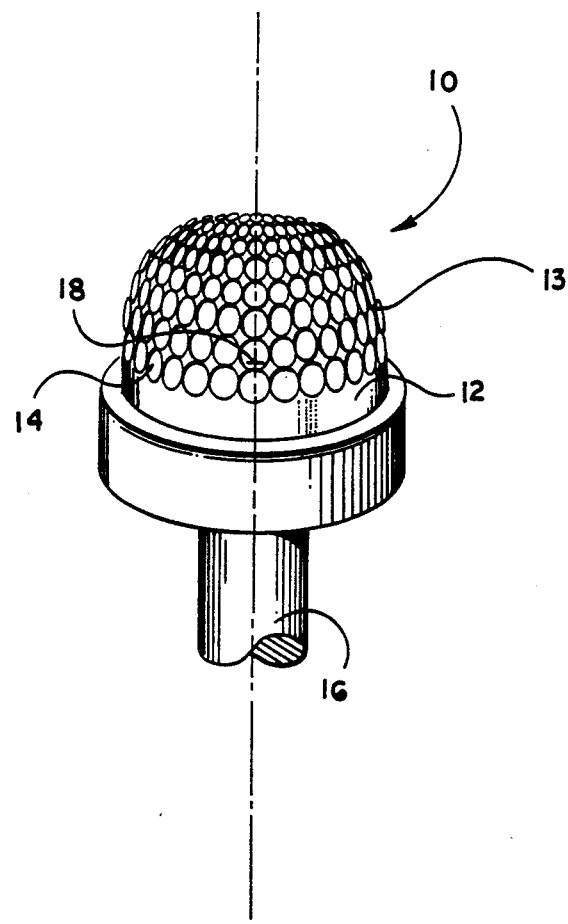
FIG_1

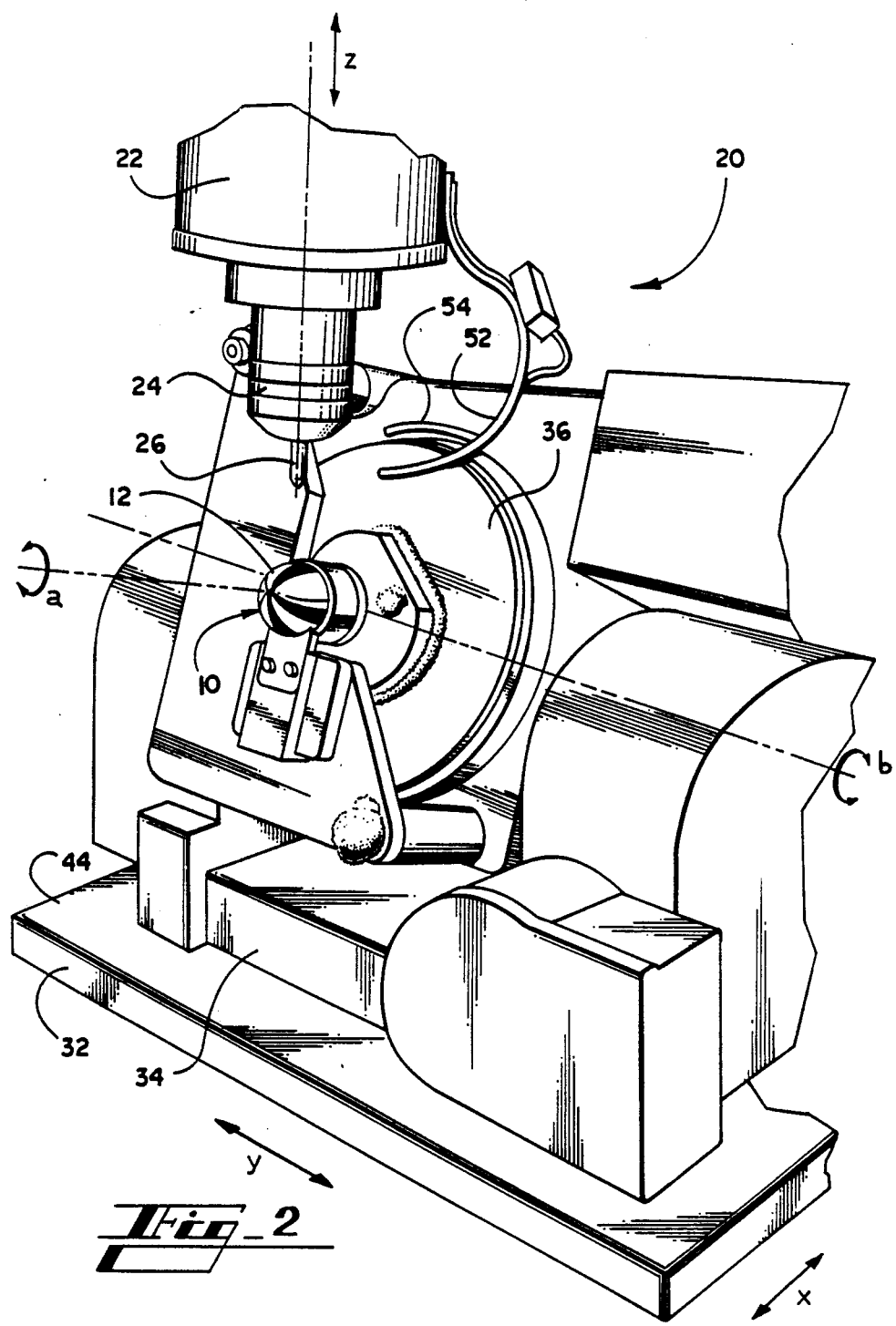
Fig_2

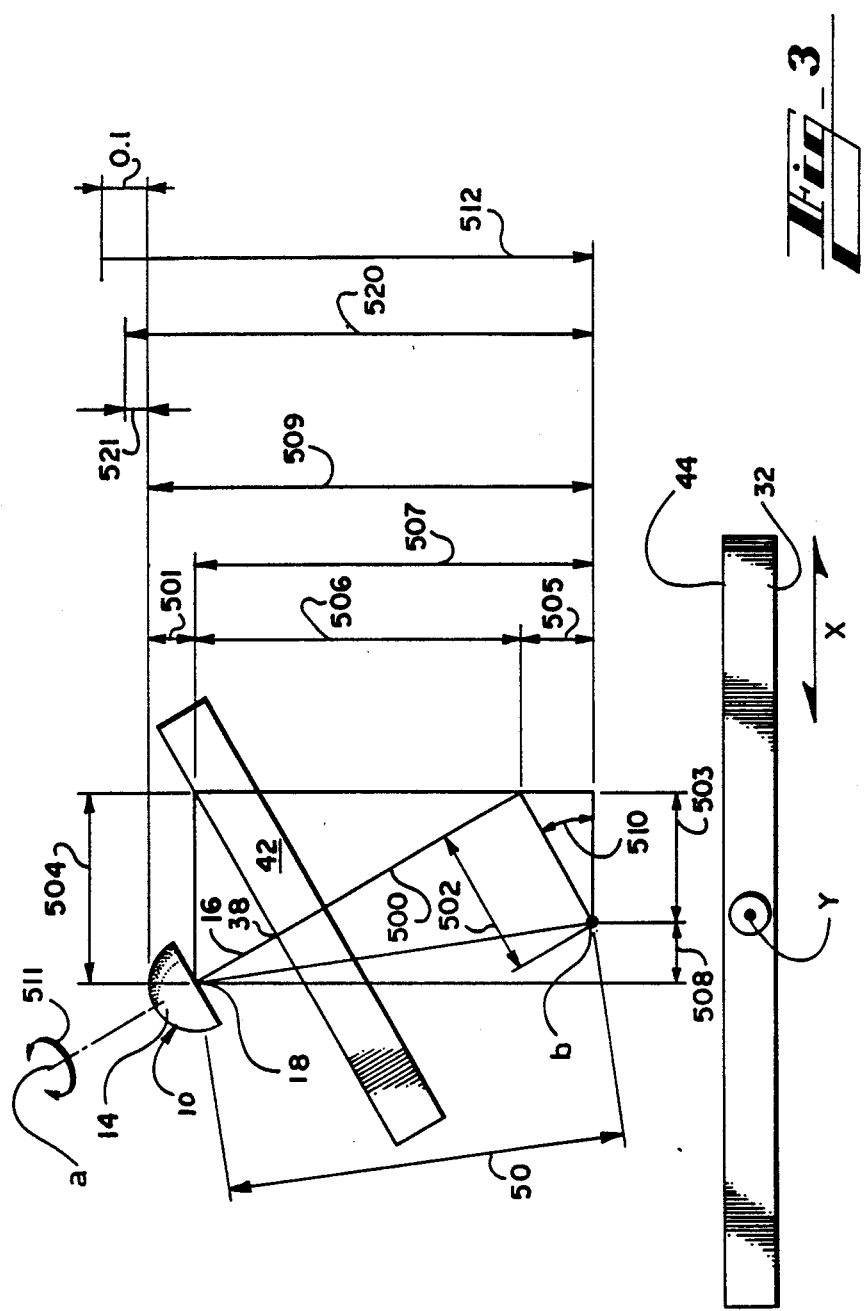

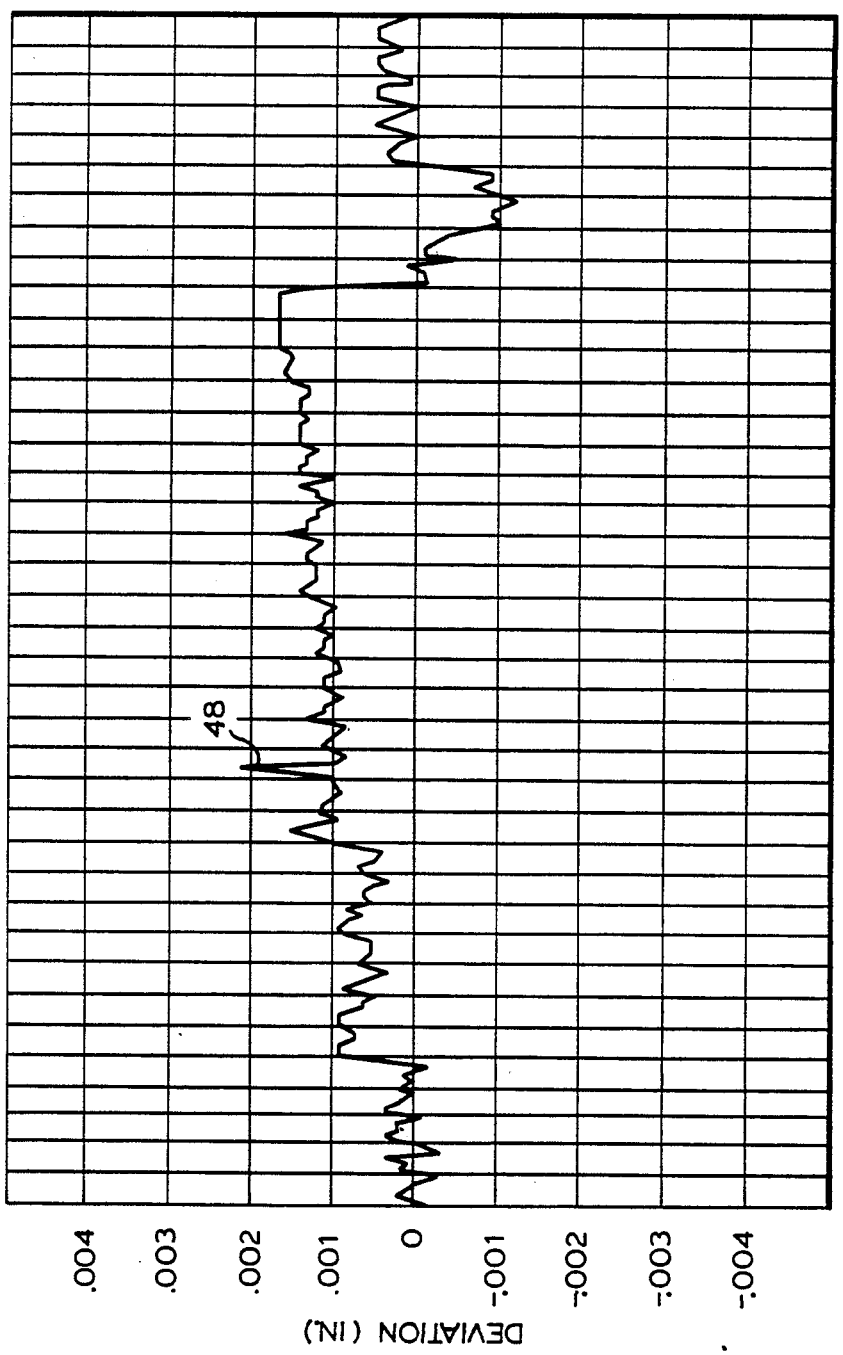

METHOD FOR MACHINING MULTIPLE CUTS IN A WORKPIECE TO A UNIFORM DEPTH

BACKGROUND OF THE INVENTION

This invention relates generally to machining or drilling the surface of a workpiece and more particularly concerns drilling multiple holes in a workpiece to a uniform depth and in the case of a curved workpiece, drilling holes that have axes that are normal or oriented at a predetermined angle to the surface of the workpiece.

In making a molded plastic article such as a golf ball, it is necessary to machine a cavity into a mold into which melted plastic material can be injected. The cavity of the mold has a machined or engraved surface pattern that produces the requisite surface pattern on the molded plastic article. In the case of a golf ball, the surface of the mold cavity has bumps that produce the characteristic dimples on the surface of the golf ball.

It is well known in the art that the internal surface for a mold, can be machined by using an electric discharge machine process. A hemispherical shaped electrode having dimples in its surface is inserted into a round mold cavity, and while applying electric current, the electrode is orbited and reciprocated to produce matching bumps on the surface of the mold cavity. Later when the mold is used for molding a golf ball, matching dimples will be formed on the molded golf ball.

In order to manufacture concave molds having an internal reoccurring pattern such as the dimples on a golf ball, it is necessary to produce that same reoccurring pattern of holes on the surface of the hemispherically shaped electrode. Particularly, it is important that the holes provided in the electrode be of a uniform depth and that the axes of those holes pass through the geometric center of the hemispherically shaped electrode which conforms to the hemispherically shape of the resulting molded golf ball.

When boring holes of a uniform depth on a hemispherical surface, such as an electrode used in the electric discharge machining of a mold cavity for a golf ball, it is necessary to orient the hemispherical electrode with respect to the axis of a boring tool (the z-axis) so that the axis of the tool is aligned with the geometric center of the hemispherical electrode. Consequently, not only does the hemispherical electrode have to move in the horizontal plane of the bed of the machine tool (defined by the x-axis and the y-axis), but also the hemispherical electrode must be pivoted about an axis (b) which lies parallel to the horizontal plane and must rotate about the axis (a) of the hemisphere.

Particularly, with regard to the pivot axis (b), it is difficult to assure that hemispherical surface of the electrode will be accurately oriented when pivoted about the axis (b) because the hemispherical surface extends out from the b-axis by the length of the stem of the electrode. Any tolerance in the pivot angle around the b-axis will result in substantial deviation along the z-axis at the hemispherical surface of the electrode. Consequently, a numerically controlled machine tool cannot accurate drill multiple holes to a uniform depth because of the inability to know, within acceptable tolerance, exactly where the surface of the hemisphere is along the z-axis.

Moreover, because of the inaccurate pivoting of the hemispherical surface with respect to the b-axis, the center of the hemisphere may be moved along the x-axis to a position that is offset from the point where the tool (the z-axis) projects into the horizontal plane defined by the x-axis and the y-axis. That offset of the z-axis will result in the axis of the hole not passing through the center of the hemisphere and therefore not being perpendicular or normal to the hemispherical surface of the electrode.

It is therefore an object of the present invention to provide a method for machining a surface of a workpiece with a tool to provide multiple cuts having uniform depths.

It is likewise an object of the present invention to provide a method for machining a surface of a workpiece with a tool having an axis so that the axis of the tool engages the surface of the workpiece at a predetermined angle.

It is also an object of the present invention to provide a method for machining a surface of a workpiece in which the exact position of the surface of the workpiece is sensed for each cut made in the workpiece, and the exact positions of the workpiece with respect to the expected positions of the workpiece are displayed to insure that each subsequent cut was made to the same uniform depth as the previous cuts in the workpiece.

It is also an object of the present invention to monitor any deviation in the expected position of the workpiece and the exact position of the workpiece to determine that the axis of the tool remains at a predetermined angle to the surface of the workpiece.

The foregoing objectives are accomplished by using a numerical controlled machine tool having five axes of orientation to make multiple cuts in the curved surface of a workpiece, particularly the hemispherical surface of an electrode to be used to electric discharge machine the cavity of a mold for a golf ball. In order to assure uniform depth cuts which are made at a predetermined angle to the surface, the workpiece is insulated from the machine tool, and the workpiece and the tool of the machine tool are connected to an electric circuit which senses the electrical contact between the workpiece and the tool and thereby records the sensed or exact position of the surface of the workpiece. Once the surface of the workpiece has been located by the electric sensing, the machine tool is advanced a predetermined incremental distance to assure a predetermined depth of cut.

The deviation between the sensed or exact position of the surface of the workpiece and the anticipated or expected position of the workpiece based on the orientation of the axes on the machine tool is used to monitor the position of the workpiece to assure that the surface of the workpiece is accurately sensed during subsequent machining steps and to calculate an angle between the surface and the axis of the tool to assure that the axis of the tool is oriented at the predetermined angle to the surface of the workpiece.

In order to assure accurate sensing of the position of the workpiece, the workpiece is sprayed with a nonconductive enamel layer prior to machining so that a false electrical contact is not created by conductive debris which may accumulate on the surface of the workpiece during the machining operation. Likewise, a lubricating, electrically nonconductant coolant is used during the actual machining of the workpiece to assure that a film of liquid on the workpiece does not provide a erroneous path of conduction between the tool and the workpiece thereby providing false sensing of the position of the surface of the workpiece. In addition, we have found that a liquid lubricant coolant which contains a silicone compound minimizes tearing of the copper material of the workpiece thereby providing a more uniform bore and less large particles of debris which may become engaged between the tool and the workpiece thereby providing false sensing of the position of the surface of the workpiece.

Other objects and advantages of the invention will become apparent upon reading the following detailed description and upon reference to the drawings.

BRIEF DESCRIPTION OF THE DRAWINGS

FIG. 1 is a perspective view of an electrode which has been machined in accordance with the method of the present invention;

FIG. 2 is a perspective view of a numerically controlled machine tool which may be used in connection with the present invention;

FIG. 3 is a schematic diagram of the machine tool of FIG. 2 showing the five axes of orientation; and FIG. 4 is a graph which records deviations between the sensed positions and the expected positions of the surface of the workpiece and provides an indication of false sensing of the location of the surface of the workpiece.

DETAILED DESCRIPTION OF THE INVENTION

While the invention will be described in connection with the preferred method, it will be understood that we do not intend to limit the invention to that method. On the contrary, we intend to cover all alternatives, modifications, and equivalents as may be included within the spirit and scope of the invention as defined by the appended claims.

Turning to FIG. 1, there is shown an electric discharge machine electrode 10 which for purposes of illustration is used to electric discharge machine the inside surface of a cavity for injection molding a golf ball. The electrode 10 is hemispherical in shape, has a center 18, and has a surface 12 with a surface pattern 13 consisting of a number of holes 14. The hemispherically shaped electrode 10 is mounted on a stem 16 which is inserted into an electric discharge machine for holding the electrode and for providing to it electric current.

The holes 14 of the surface pattern 13 are arranged in the same manner that is desired for the dimples on the surface of the resulting golf ball. When the electrode 10 is used to electric discharge machine the inside of a mold cavity, the holes 14 on the electrode produce corresponding bumps on the internal surface of the mold cavity. When a liquid polymer is injected into the mold cavity, the resulting golf ball has dimples that correspond to the bumps on the internal surface of the cavity. In order to form the hole pattern 13 on the surface of the electrode 10, it is necessary for the holes 14 to be drilled to a uniform depth and for the axis of each hole to be aligned with the geometric center 18 of the hemispherically shaped electrode 10.

In order to drill holes in the electrode 10 to a uniform depth and in alignment with the geometric center 18, a numerically controlled machine tool 20 such as that shown in FIG. 2 can be utilized. The numerically controlled machine tool 20 comprises a head 22, a tool holding turret (not shown), a horizontal movable bed 32, a rotatable-tiltable table 34 mounted on the bed, and a numerical controller (not shown). The head 22 of the numerically controlled machine tool 20 includes a chuck 24 which holds a cutting tool 26. The chuck is rotated by a suitable source of motive power (not shown), and the chuck, the head, and the tool all advance and retract along the z-axis (FIG. 3) under the control of the controller which monitors the position of the chuck and tool with respect to the fully retracted position of the head.

The turret provides the numerically controlled machine tool 20 with the option of substituting tools 26 in order to bore larger or smaller holes. Tool changing is done automatically and under the supervision of the controller which is programmed for selecting a particular tool for a particular operation from the tools held by the turret.

The horizontal bed 32 defines a horizontal plane 44 and is movable both along the x-axis and the y-axis in order to locate a workpiece in the horizontal plane 44 under the tool 26. In order to provide angular orientation for the workpiece, the rotatable-tiltable table 34 is mounted on the movable bed 32 and has a workpiece holding turntable 36. The turntable defines a plane 42, and the workpiece is clamped at the center 38 which coincides with the turntable's axis of rotation (a) (FIGS. 2 and 3). In addition, the turntable 36 can be tilted about an axis (b) (FIGS. 2 and 3). The b-axis is parallel to the y-axis, and the plane 42 of the turntable 36 tilts about the b-axis to a pivot angle 510 to the horizontal plane 44 of the bed 32.

Together, the x-axis, the y-axis, the a-axis, and the b-axis are a reference coordinate system which locates the workpiece in space with respect to the z-axis and the tool 26. By inputting the appropriate values for those coordinate, any point on the surface of the workpiece can be aligned with the z-axis and the tool 26. In addition the workpiece can be angularly oriented by selecting appropriate values for the angle of rotation 511 about the a-axis and the pivot angle 510 about the b-axis so that the z-axis can be oriented with respect to the surface at a predetermined angle. Such manipulation of a workpiece by a numerically controlled machine tool is well known in the art. A suitable numerically controlled machine tool 20 described above is sold by Technics, Inc. of New Jersey. The rotatable-tiltable table 34 is sold by Nikken, Inc. of New Jersey.

Turning to FIG. 3, there is shown schematically the geometric relationship between the various elements of the numerically controlled machine tool 20 and the electrode 10 clamped to the turntable 36. The geometric relationships shown in FIG. 3 can be used to locate a point on the surface 12 of the electrode 10 with respect to the z-axis and the tool 26. The radius 501 of the hemispherical electrode 10 is a known quantity. In addition, the a-axis of the table 34 and the b-axis of the table 34 for this particular embodiment have an offset 502 of 60 mm. By moving the horizontal bed 32 along the x-axis and along the y-axis, by tilting the turntable 36 about the b-axis, and by rotating the electrode 10 on the turntable 36 around the a-axis, a point on the surface 12 of the electrode 10 can be located directly below the z-axis of the tool 26, and the surface 12 can be oriented at a predetermined angle to the z-axis of the tool 26.

Because of the extended length of the lever arm 50 between the b-axis and the center 18 of the electrode 10, any tolerance in the pivot angle 510 about the b-axis will result in a substantial movement of the surface 12 of the electrode 10 from the expected position as determined by the input parameters (the x-axis and y-axis location of the bed 32, the pivot angle 510, and the angle of rotation 511).

In order to bore a hole to a uniform depth in the surface of the electrode 10, it is necessary to measure the depth of bore not from the expected position of the surface 12 (as defined by the reference coordinate system of the machine tool), but from the actual position of the surface 12 of the electrode 10. In order to determine the actual position of the surface 12 of the electrode 10, the turntable 36 is electrically insulated from the metal frame of the rest of the machine tool 20. An electrical circuit (not shown) is provided with one lead attached to stem 16 of the electrode 10. The other lead of the electrical circuit is attached to the chuck and therefore to the cutting tool 26. As the cutting tool 26 is advanced toward the surface 12 of the electrode 10 along the z-axis in incremental steps by the machine tool 20, the electrical circuit in conventional fashion senses an open connection between the cutting tool 26 and the electrode 10. Once the cutting tool 26 touches the surface 12 of the electrode 10, the electrical circuit senses the electrical contact and indicates that contact to the controller. The controller then records the actual position of the tool 26 along the z-axis and moves the tool 26 from that actual position to the predetermined set depth of the desired cut.

Once the cut has been completed, the pivot angle 510 about the b-axis, the rotation angle 511 about the a-axis, the expected position 509 along the z-axis, the sensed position 520 along the z-axis, and the deviation 521 between the expected position 509 and the sensed position 520 are all sent to the output port of the controller for recording. The location of each hole cut is identified by the pivot angle 510 and the rotation angle 511. The deviation 521 is recorded for each location. A graph, such as that shown in FIG. 4, provides a continuous visual monitor for the process. The deviation 521 is recorded along the vertical axis in inches. Each index along the horizontal axis (the vertical lines) represents a new pivot angle 510 about the b-axis. Between each vertical line there are three holes recorded, one for each new rotation angle 511 about the a-axis. Any significant variation in the deviation on the graph between vertical lines represents an erroneous sensing of the actual position of the surface 12 of the electrode 10. Variation in the deviation that occurs at a vertical line on the graph results from the change in the pivot angle 510 and therefore does not represent an erroneous sensing of the position of the surface 12 of the electrode 10.

Particularly, the hole 48 at a location identified by a pivot angle 510 (b-axis) and a rotation angle 511 (a-axis) shows a deviation between the vertical lines far exceeding that of the holes on either side of it. Consequently, the operator can quickly identify a circumstance in which the sensing circuit sensed the actual position of the surface before it should have. Such a circumstance can exist when a particle of metal becomes wedged between the tool and the surface thereby falsely triggering the sensing circuit and starting the drilling process at a point higher than appropriate. The result is a hole that is too shallow. Consequently, from the location information (pivot angle 510 and rotation angle 511), the operator can go back to hole 48 where sensing occurred prematurely and can rework the hole to the proper depth.

The deviation 521 also can be used to monitor and thereby assure that the axis of the drilled hole is normal to the surface 18 of the electrode 10 or is oriented at any other predetermined angle to the surface of the electrode. As long as the deviation 521 remains within specified limits, the axis of the drilled hole will remain properly oriented to the surface based on the setup orientation of the x-axis, the y-axis, and the b-axis. If the deviation varies beyond the specified range, such deviation in the surface's z-axis orientation will result in an offset of the center 18 and a variation in the angle of the hole's axis to the surface.

In order to assure that the sensing circuit is not activated prematurely by particles of metal that result from the cutting process, we have found that a coating of an insulating enamel applied to the electrode's surface 12 prior to machining will eliminate premature sensing when small particles of metal are present on the surface of the electrode 10. The enamel on the surface 12 insulates the tool from the electrode until sufficient pressure has been exerted by the tool to break through the enamel on the surface 12 and establish electrical contact. A suitable enamel is any good quality oil based spray paint. Particularly, we have found that Ace Hardware brand enamel will provide suitable insulation and protection against premature sensing of the electrode surface.

Also, in order to insure that large particles do not become wedged between the tool and the electrode which may be sufficiently large to break through the insulative enamel, we direct a stream of air via nozzle 52 against the electrode surface 12 at all times except when the tool 26 is actually performing its cutting operation. The nozzle 52 has an inside diameter of 3/16 inch, and the air pressure is 40 psi. That pressure and nozzle size give sufficient velocity to the air to remove most particles from the surface 12 of the electrode 10.

Finally, in order to minimize premature sensing of the electrode surface, we use an insulating, silicone based cooling and lubricating liquid directed via tube 54 against the tool 26 and the electrode 10 during the cutting operation. The insulating liquid assures that on subsequent contacts by the tool, the liquid layer does not form an electric contact path thereby causing the sensing circuit to be triggered by the liquid layer level on the electrode as opposed to the surface itself. The silicone based cooling and lubricating liquid for copper electrodes provides cutting which is smoother with less tearing of the electrode surface by the tool. The reduced tearing produced by the silicone lubricant results in a smoother cut and a reduced presence of larger particles which are more likely to cause breakthrough of the enamel coating and thereby premature sensing. We have found that a commercially available lubricant sold under the brand name WD-40 is a particularly suitable lubricant and coolant for the process.

In order to carry out the foregoing process, the following program is illustrative for drilling of holes to a uniform predetermined depth with the axis of the holes passing through the center of the hemispherical electrode 10. The angles are in degrees, and the dimensions are in inches (except for the offset 502 which is in millimeters but is converted to inches by the controller):

Main Program zero return z-axis [tool 26 returned to retracted position by the controller]

zero return x-axis, y-axis, a-axis, and b-axis [bed 32 returned to home position, turntable 36 rotated to zero degrees, and plane 42 of turntable 36 returned to horizontal by the controller]

input part zero x-, y-, a-, and z-axis [input values to the controller for the part to be machined]
optional stop
change tool to number 1 [the controller selects tool 26 from the turret]
    spindle on clockwise 1000 RPM [tool 26 rotating]
    set variable #500=distance from b-axis to center 18 of electrode 10
    #501=electrode radius
    #502=60 mm
    #513=depth of cut=0.011 in.
    #510=pivot angle=84.767° from horizontal about b-axis
    #511=rotation angle=22.433° from zero about a-axis
    go to sub program 1
    #510=pivot angle=84.55° from horizontal about b-axis
    #511=rotation angle=11.65° from zero about a-axis
    go to sub program 1
    #510=pivot angle=84.55° from horizontal about b-axis
    #511=rotation angle=−11.65° from zero about a-axis
    go to sub program 1
    zero return z-axis [tool 26 returned to retracted position by the controller]
    zero return x-axis and y-axis [bed 32 returned to home position]
optional stop
input part zero z-axis [input value to the controller for the part to be machined]
change tool to number 2 [the controller selects tool 26 from the turret]
    spindle on clockwise 1000 RPM [tool 26 rotating]
    #513=depth of cut=0.0105 in.
    #510=pivot angle=84.55° from horizontal about b-axis
    #511=rotation angle=44.55° from zero about a-axis
    go to sub program 1
    #510=pivot angle=84.55° from horizontal about b-axis
    #511=rotation angle=−44.55° from zero about a-axis
    go to sub program 1
    #510=pivot angle=84.55° from horizontal about b-axis
    #511=rotation angle=0° from zero about a-axis
    go to sub program 1
    zero return z-axis [tool 26 returned to retracted position by the controller]
    zero return x-axis and y-axis [bed 32 returned to home position]
optional stop
input part zero z-axis [input value to the controller for the part to be machined]
change tool to number 3 [the controller selects tool 26 from the turret]
    spindle on clockwise 1000 RPM [tool 26 rotating]
    #513=depth of cut=0.0095 in.
    #510=pivot angle=84.3° from horizontal about b-axis
    #511=rotation angle=55.567° from zero about a-axis
    go to sub program 1
    #510=pivot angle=84.3° from horizontal about b-axis
    #511=rotation angle=−55.567° from zero about a-axis
    go to sub program 1
    zero return z-axis
    zero return x-, y-, a-, and b-axis
end

Sub Program Number 1

503=cos (#510) \*#502
505=sin (#510) \*#502
506=cos (#510) \*#500
504=sin (#510) \*#500
507=#505+#506
508=#503−#504
509=#507+#501
512=#509+0.1
zero return z-axis
move bed 32 along x-axis to #508, along y-axis to 0
rotate turntable 36 about a-axis to #511
go to sub program number 2 and repeat sub program 3 times
end of sub program number 1

Sub Program Number 2 move tool 26 along z-axis to #512, air on
move tool 26 along z-axis incrementally by −0.095 in.
activate 24 volt pick-up sense circuit and move tool 26 along z-axis until electric contact between tool and electrode
521=present position of tool 26 along z-axis-#509
520=present position of tool 26 along z-axis
feed tool 26 along z-axis a distance of #513, air off, lubricant on
dwell 0.1 seconds
move tool 26 along z-axis to position #512, air on, lubricant off
send #510, #511, #509, #520, & #521 out the I/O port to controller
rotate turntable 36 about a-axis incrementally 120.0°
511=#511+120.0°
end of sub program number 2

We claim:

1. A method for machining a surface of a workpiece with a tool to provide multiple cuts having uniform depths comprising the steps of:
   a. orienting the workpiece with respect to a reference coordinate;
   b. recording an expected position of the surface of the workpiece with respect to the reference coordinate;
   c. advancing the tool toward the surface;
   d. sensing contact of the tool with the surface;
   e. advancing the tool a predetermined distance to thereby machine the workpiece to a predetermined depth;
   f. recording a sensed position of the workpiece with respect to the reference coordinate as a result of the contact of the tool with the surface;
   g. comparing the sensed position to the expected position and calculating a deviation of the surface from the reference coordinate; and
   h. using the deviation to monitor the position of the workpiece to assure that the position of the surface of the workpiece is accurately sensed during subsequent machining steps.

2. The method of claim 1, wherein the workpiece is electrically conductive and is electrically insulated from the tool and both are connected to an electrical circuit which senses the electrical contact between the tool and the workpiece.

3. The method of claim 2, wherein as the tool is advanced toward the surface, the surface is cleared of debris by means of air flow against the surface.

4. The method of claim 3, wherein the workpiece prior to machining is coated with a nonconductive layer.

5. The method of claim 4, wherein the workpiece is lubricated during machining by the tool with an electrically nonconductive liquid lubricant.

6. The method of claim 5, wherein the liquid lubricant contains a silicone compound.

7. A method for maching a surface of an electrode of an electric discharge machine with a tool to provide multiple cuts having uniform depths comprising the steps of:
   a. orienting the electrode with respect to a reference coordinate;
   b. recording an expected position of the surface of the electrode with respect to the reference coordinate;
   c. advancing the tool toward the surface;
   d. sensing contact of the tool with the surface;
   e. advancing the tool a predetermined distance to thereby machine the electrode to a predetermined depth;
   f. recording a sensed position of the electrode with respect to the reference coordinate as a result of the contact of the tool with the surface;
   g. comparing the sensed position to the expected position and calculating a deviation of the surface from the reference coordinate; and
   h. using the deviation to monitor the position of the electrode to assure that the position of the surface of the electrode is accurately sensed during subsequent machining steps.

8. The method of claim 7, wherein the electrode is electrically insulated from the tool and both are connected to an electrical circuit which senses the electrical contact between the tool and the electrode.

9. The method of claim 8, wherein as the tool is advanced toward the surface, the surface is cleared of debris by means of air flow against the surface.

10. The method of claim 9, wherein the electrode prior to machining is coated with a nonconductive layer.

11. The method of claim 10, wherein the electrode is lubricated during machining by the tool with an electrically nonconductive liquid lubricant.

12. The method of claim 11, wherein the liquid lubricant contains a silicone compound.

13. A method for machining a curved surface of a workpiece with a tool having an axis to provide multiple cuts normal to the surface and having uniform depths comprising the steps of:
   a. orienting the workpiece with respect to a reference coordinate;
   b. recording an expected position of the surface of the workpiece with respect to the reference coordinate;
   c. advancing the tool toward the surface;
   d. sensing contact of the tool with the surface;
   e. advancing the tool a predetermined distance to thereby machine the workpiece to a predetermined depth;
   f. recording a sensed position of the workpiece with respect to the reference point as a result of the contact of the tool with the surface;
   g. comparing the sensed position to the expected position and calculating a deviation of the surface from the reference coordinate; and
   h. using the deviation to monitor the position of the workpiece to assure that the position of the surface of the workpiece is accurately sensed during subsequent machining steps and to calculate an angle between the surface and the axis of the tool to assure that the axis of the tool is normal to the surface.

14. The method of claim 13, wherein the workpiece is electrically conductive and is electrically insulated from the tool and both are connected to an electrical circuit which senses the electrical contact between the tool and the workpiece.

15. The method of claim 14, wherein as the tool is advanced toward the surface, the surface is cleared of debris by means of air flow against the surface.

16. The method of claim 15, wherein the workpiece prior to machining is coated with a nonconductive layer.

17. The method of claim 16, wherein the workpiece is lubricated during machining by the tool with an electrically nonconductive liquid lubricant.

18. The method of claim 17, wherein the liquid lubricant contains a silicone compound.

* * * * *